Nov. 12, 1929.  J. R. LEVY  1,735,504
DISTRIBUTING DEVICE
Filed Feb. 9, 1927  2 Sheets-Sheet 1

J. R. Levy
INVENTOR

By: Marks & Clark
Attys.

Nov. 12, 1929.　　　　　　J. R. LEVY　　　　　　1,735,504
DISTRIBUTING DEVICE
Filed Feb. 9, 1927　　　2 Sheets-Sheet 2
Fig.4.　　　　Fig.7.　　　　Fig.8.
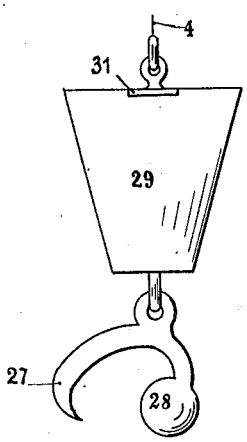
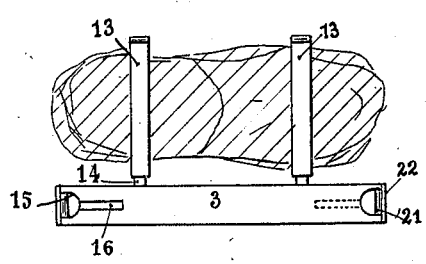
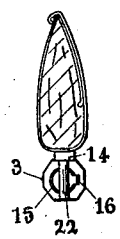
Fig.5.　　　　Fig.9
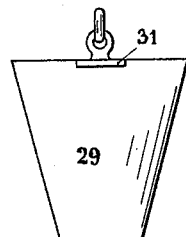
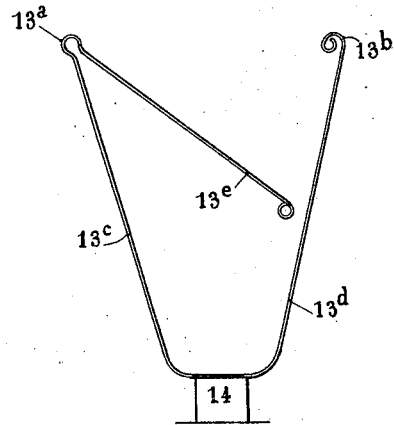
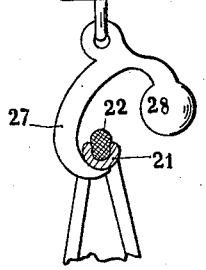
Fig.10.
Fig.6.
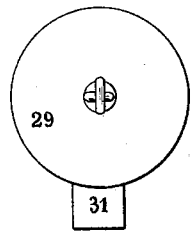
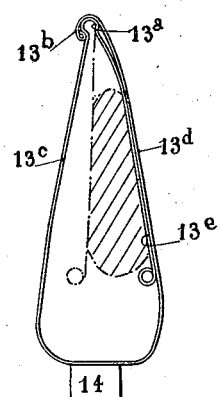
J. R. Levy
INVENTOR
By: Marks & Clark
Attys.

Patented Nov. 12, 1929

1,735,504

UNITED STATES PATENT OFFICE

JACK RAYMOND LÉVY, OF PARIS, FRANCE, ASSIGNOR TO SOCIÉTÉ EN COMMANDITE PAR ACTIONS OSCAR LÉVY, SES FILS & CIE (SOCIÉTÉ DES CHAUSSURES CECIL), OF PARIS, FRANCE

DISTRIBUTING DEVICE

Application filed February 9, 1927, Serial No. 167,063, and in France September 22, 1926.

The present invention relates to an apparatus for distributing articles one by one or in any other desired quantity, for example distributing articles contained in a reserve magazine to another magazine situated beneath it, such as a selling magazine.

By the use of the distributing device according to the invention it is possible to distribute articles of varying weight and shape rapidly and continuously without the necessity of performing any special operation; the device is, moreover, very simple in arrangement, operates satisfactory, and is inexpensive to maintain.

According to the magnitude of the installation the apparatus is formed by joining together, upon any suitable vertical support, such as a wall or column, any number of similar distributor elements which are each essentially characterized by the combination of movable members adapted to convey the articles to be distributed, vertical or inclined guiding means for these movable members and a device for retarding the movement of descent.

Moreover this vertical or inclined guiding means is preferably fitted with devices for braking and locking the movable members at the bottom end of their travel.

According to the invention, the articles to be distributed are separately secured, in the reserve magazine, to the movable members, the latter being then successively engaged in the desired order upon the vertical guiding member along which they slide at a slackened speed in order to stop without violent shock at the bottom end. These movable members can then be successively disengaged from the guiding member and the articles to be distributed are immediately separated from them.

The invention also consists in the construction of the distributor element according to which the movable member is balanced by a counterpoise by means of a cord passing over a grooved pulley, which counterpoise moves in a vertical tube after the manner of a piston in a cylinder, the tube closed and provided at its ends with regulating valves, in such a way that as a result of the downward movement of the movable member the displacement of the counterpoise will compress the air in one part of the tube and produce a reduction in pressure of the air in the other part of the tube, resulting in a slackening of this downward movement.

According to the invention the movable member is suspended from the cord by means of a special hook which is separated automatically from this member when the latter reaches the bottom point of its travel, so that under the effect of the counterpoise the hook is then immediately brought back to the top point of its travel and permits the distributor to be employed again.

The invention further consists in a mode of construction of the movable member, wherein the latter includes means for acting as a brake in the vertical guide towards the end of its travel and is also provided with prehensile members, which are very easily manipulated, adapted to seize articles of varying dimensions and shapes and more particularly adapted for use in handling footwear slippers and similar parts of wearing apparel.

The invention will be briefly described hereinafter with reference to the accompanying drawings which illustrate it by way of example, and in which Fig. 1 is a general view of a distributor element.

Figs. 4, 5 and 6 show the suspension hook of the movable member in elevation and empty, and carrying a movable member and in plan, respectively.

Figs. 7 and 8 show, in front and side view respectively, the movable member to which an article is attached.

Figs. 9 and 10 are two views to a larger scale of one of the grasping means of the movable member.

Figure 1:
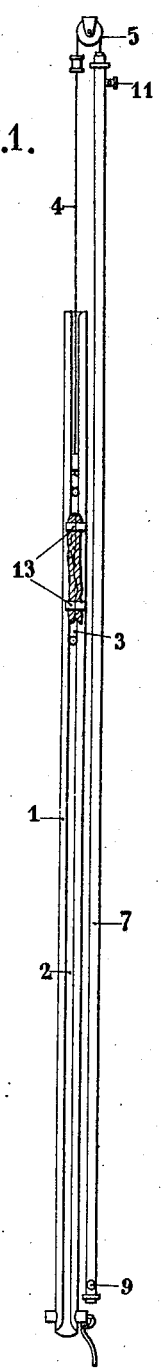
Figure 2:
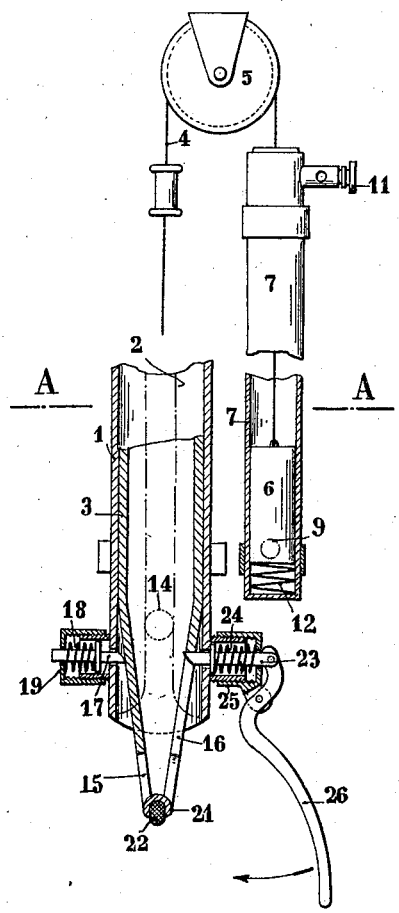
Fig. 2 is a view to a larger scale showing the ends of the apparatus partly in vertical section, a movable member being assumed to have reached the bottom point of its travel in the apparatus.
Figure 3:
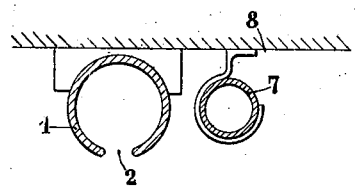
Fig. 3 is a section taken along the line A—A in Fig. 2.

Referring to Figs. 1, 2 and 3, it is seen that the apparatus essentially comprises a vertical guide 1 formed preferably by a tube having a longitudinal slot 2 in which slides a movable member, the body 3 of which possesses practically the internal dimensions of the guide 1. This movable member is suspended from a cord 4 which passes over a pulley 5 and supports a counterpoise 6. The counterpoise 6 is thus adapted to be displaced in a cylindrical tube 7, the ends of which are closed.

The arrangement formed by these members is secured by any known means to a suitable support 8, such as a wall, partition, etc.

There are also shown in Fig. 2, at 9 and 11, two valves, such as screw needle valves, which permit the passage for the air which tends to be alternately expanded and compressed in the two lower and upper parts of the cylinder 7, to be regulated.

It will be understood that by suitably regulating the degree of closure of these apertures it will be possible to obtain, under given loads of the movable member, a sufficiently slow movement of the movable arrangement.

A spring 12 enables a violent impact at the end of the fall of the counterpoise 6 to be avoided.

Moreover, the apparatus comprises means for slackening and arresting the descent of the movable members. For this purpose the body 3, which is practically cylindrical in its central portion (Figs. 3 and 7) has two ends flattened in one single plane.

The prehensile members 13 also have this plane as plane of symmetry, so that the bases 14 of these members serving as guiding means for the body 3 in the groove 2, the body 3 is necessarily in the position in Fig. 2 when the movable member reaches the bottom point of its travel.

Further, the two ends of the body 3 are symmetrically arranged relatively to the centre of this body so that the movable member, when it is introduced at the upper part, can be placed therein indifferently by one end or the other.

It is seen, in Fig. 2, that the left hand inclined plane at the end of the body 3 shown is provided with a slot 15 of any form, for example circular (see also Fig. 7).

The right hand inclined plane (Fig. 2) is also provided with a slot 15, and this slot is extended by a longitudinal slot 16 (see also Fig. 7).

The two inclined planes are connected together by a short cross piece 21 which is preferably provided with an elastic pad 22 on the outside.

Moreover, the guide 1 is provided at its lower part with means for restraining and locking the movable member 2 when it reaches its bottom position.

For this purpose a bolt 17 provided with an end bevelled on the upper side, which bolt is driven towards the centre of the tube by a spring 18 located in a casing 19, and presses upon the left hand inclined plane at the end of the movable member. The descent of this member as far as the bottom point shown in Fig. 2 therefore permits the spring 18 to store an amount of work practically equal to the kinetic energy possessed by the loaded movable member and thus a violent impact to be avoided.

In addition, by the side of the right hand inclined plane at the end of the body 3 (Fig. 2) is a bolt 23 provided with a beak which is not bevelled at the upper side which bolt is acted upon like the bolt 17 by a spring 24 abutting against a casing 25.

When the movable member falls the bolt 23 enters into the slot 15, and, as shown abuts against the transverse edge of the slot, thus forming an extremely simple means for stopping the body 3.

It is sufficient, at the desired moment, to press in the direction of the arrow, upon a lever 26, pivotally connected to the bolt 23, in order to release the member 3 from the guide 1.

It has also been mentioned that the movable member is suspended from the cord by means of a special hook which permits it to be automatically unhooked, when the downward movement of the movable member ceases.

According to a preferred form of construction, shown in Figs. 4, 5 and 6, the hook 27 includes a small weight 28. It is also provided with a guiding means such as a cone 29, the larger base of which has a diameter practically equal to the internal diameter of the guide 1. This cone preferably comprises a lug 31 which is adapted to slide in the groove 2.

Moreover, according to an advantageous arrangement this cone is preferably hollow and may be loaded at will with lead shot, for the purpose of regulating its return movement upwards.

A special form of the prehensile means of the movable member is also shown in Figs. 9 and 10.

According to the arrangement shown, this movable member comprises two claws each formed by an elastic band 13 made of a suitable metal, such as steel, which is initially bent and curved as shown in Fig. 9. This band is attached at 14 to the body 3 of the movable member by any suitable known means.

The buckle $13^a$ may be secured, as shown in Fig. 10, in the hook $13^b$.

It is therefore seen that, according to the dimensions and the shape of the articles to be distributed, the latter may be gripped in the arrangement formed by these two claws, either between the branches $13^c$ and $13^d$ of the claw, or between the branches $13^d$ and $13^e$ (Fig. 10).

Moreover, any other attachment device could be employed according to the nature, weight and volume of the articles to be carried.

The apparatus thus described, its operation is as follows:

The valves being assumed to be regulated for the transport of a certain type of article, an employee at the store attaches the articles in succession to the movable members placed at his disposal and he does this under the conditions necessary for the distribution, for example in pairs of different sizes in the case of footwear, or similar articles.

As required by the employees in the lower shop, which is, for example a selling shop, the member loaded with the desired article is suspended from the hook 27 by the small bar 21 and it is introduced into the guide 1.

The movable arrangement descends by its own weight the speed of downward movement being slackened to the required degree by the operation of the pneumatic brake.

When the movable member reaches the lower point the speed of the movable member is rapidly restrained and then stopped by the action of the bolts 17 and 23.

At this moment on account of their inertia, the hook 27 and the cone 29 continue to descend for some moments, the upper cross piece 21, through the medium of the elastic pad 22, then abuts upon the internal part of the hook, in the direction of the arrow shown in Fig. 5, and thus disengages the hook from the movable member, the counterpoise 28 maintaining it in the disengaged position. (Fig. 4.) The counterpoise 6, which the falling movement of the member 3 has brought into its upper position, falls of its own account, bringing the hook back into its lower initial position.

The apparatus is then ready to be employed again. The movable members successively introduced and thus sent down stop at the lower part of the distributor where they remain superposed upon each other in the order in which they arrive.

The distribution or selling employees can disengage them at will.

It is sufficient for them, in fact, in order to do this in a single and sole operation, to actuate the lever 26, engaging a finger in the notches 15 (Fig. 2). The movable member having been liberated it is removed by exerting a slight pull.

The following member then takes the place of the first and can be liberated in its turn.

It is therefore clearly seen that the apparatus enables articles to be distributed in a continuous manner while it requires only very simple operations on the part of the staff.

The operation is almost entirely automatic, the apparatus being always ready to work.

Note must also be taken of the great advantage derived from the use of this device, in which the introduction of the articles is independent of their release.

Further, and in a general manner, the invention is in no way limited to the form of construction which has been described and illustrated above and in which all modifications of details may be made without altering its principle.

Claims:

1. A distributor element comprising in combination movable members provided with members for the attachment of the articles to be distributed, guiding means for the displacement of said movable members, means for slackening the speed of fall of the said movable members comprising the combination of a grooved pulley, a cord passing over said pulley supporting a hook for said movable members and, a cylindrical counterpoise movable, after the manner of a piston in a cylinder, in a cylindrical tube provided at its ends with regulating valves.

2. A distributor comprising in combination movable members provided with members for the attachment of the articles to be distributed, guiding means for the displacement of said movable members, means for slackening the speed of fall of the said movable members and a device for stopping these members at the extreme portion of the said guiding means, in which each movable member has two thinned off symmetrical ends each presenting a blank side and a longitudinally slotted side, said sides being terminated by a cross piece provided with an elastic pad.

3. A distributor comprising in combination, movable distributing members, the speed of fall of which is slackened by a retarding device, said movable members sliding in a guide constituted by a tube slotted along a generating line and provided at its lower end with a spring bolt arranged opposite the blank side of the end of each movable member, and a second spring bolt which engages a slot on the other side of the end of the movable member, the latter bolt, which can stop this member at the end of its stroke, being adapted to be disengaged by a movable lever.

4. A distributor element comprising in combination movable members provided with members for the attachment of the articles to be distributed, guiding means for the displacement of said movable members, means for slackening the speed of fall of the said movable members and means for suspending the movable member from a cord carrying a counterpoise, constituted by a swinging hook comprising a weight which tends to keep it in the unhooked position, to which hook is fitted a guiding means preferably formed by a cone, the arrangement formed by the hook and this cone being lighter than the counterpoise.

5. A distributor element comprising in combination movable members, guiding means for the displacement of said movable members, means for slackening the speed of fall of the said movable members, and each movable member being provided with means for attaching the articles to be conveyed, which means consists of two or more claws each formed by an elastic band bent twice and adapted to be employed for articles of varying thicknesses.

The foregoing specification of my "improved distributing device", signed by me this 27th day of January, 1927.

JACK RAYMOND LÉVY.